United States Patent
Yang

(10) Patent No.: US 9,980,875 B2
(45) Date of Patent: May 29, 2018

(54) FUNCTIONAL CHAIR INCLUDING ACUPRESSURE BALLS

(71) Applicant: JERAGENE KOREA CO., LTD., Jeju (KR)

(72) Inventor: Byung Heon Yang, Jeju (KR)

(73) Assignee: Jeragene Korea Co., LTD., Jeju-si (KR)

( * ) Notice: Subject to any disclaimer, the term of this patent is extended or adjusted under 35 U.S.C. 154(b) by 444 days.

(21) Appl. No.: 14/773,341

(22) PCT Filed: Mar. 7, 2014

(86) PCT No.: PCT/KR2014/001873
§ 371 (c)(1),
(2) Date: Sep. 5, 2015

(87) PCT Pub. No.: WO2014/137178
PCT Pub. Date: Sep. 12, 2014

(65) Prior Publication Data
US 2016/0008211 A1  Jan. 14, 2016

(30) Foreign Application Priority Data

Mar. 7, 2013 (KR) .......................... 10-2013-0024592

(51) Int. Cl.
*A61H 7/00* (2006.01)
*A61H 15/00* (2006.01)
(Continued)

(52) U.S. Cl.
CPC ............... *A61H 15/00* (2013.01); *A47C 7/40* (2013.01); *A47C 7/46* (2013.01); *A47C 7/543* (2013.01);
(Continued)

(58) Field of Classification Search
None
See application file for complete search history.

(56) References Cited

U.S. PATENT DOCUMENTS

| | | | | | |
|---|---|---|---|---|---|
| 4,411,421 A | * | 10/1983 | Hershberger | .......... | A61H 15/00 482/132 |
| 5,240,308 A | * | 8/1993 | Goldstein | .............. | A47C 7/462 297/284.3 |
| 6,609,754 B2 | * | 8/2003 | Rajasingham | .......... | A61G 5/04 297/284.3 |
| 6,616,240 B1 | * | 9/2003 | Theosabrata | ............ | A47C 7/02 297/452.64 |
| 7,217,248 B2 | * | 5/2007 | Lin | .......................... | A47C 7/14 601/115 |
| 9,144,317 B2 | * | 9/2015 | Yang | ....................... | A47C 9/002 |
| 9,192,238 B2 | * | 11/2015 | Ho | ............................ | A47C 7/46 |
| 9,616,267 B2 | * | 4/2017 | Sassano | .................. | A63B 21/02 |
| 2002/0091342 A1 | * | 7/2002 | Tsai | ....................... | A47C 7/383 601/134 |
| 2006/0076818 A1 | | 4/2006 | Lafreniere | | |

(Continued)

FOREIGN PATENT DOCUMENTS

| KR | 10-1993-0002666 A | 2/1993 |
|---|---|---|
| KR | 20-0307943 Y1 | 3/2003 |
| KR | 10-1152330 B1 | 6/2012 |

*Primary Examiner* — Stephen R Crow
(74) *Attorney, Agent, or Firm* — Patent Office of Dr. Chung Park

(57) ABSTRACT

Disclosed is a functional chair having acupressure balls. The chair includes a chair seat; a back of a chair coupled to one side of the chair seat; a pair of acupressure plate rotary shafts which is parallel to a vertical axis at a position ambilaterally spaced at predetermined distance from the center of rear surface of the back of the chair; a pair of acupressure plates which rotate around the rotary shaft of the respective acupressure plates; and a pair of armrests fixed to one side of the respective acupressure plates, and extended to the front of the back of the chair. A plurality of operating holes is formed on the front of the back of chair. A sleeve for covering the acupressure plate rotary shaft is positioned along a lengthwise direction on the respective acupressure plates and the acupressure rotary shaft penetrates the respective acupressure plates.

4 Claims, 7 Drawing Sheets

(51) Int. Cl.
*A47C 7/40* (2006.01)
*A47C 7/46* (2006.01)
*A47C 7/54* (2006.01)
*A47C 9/00* (2006.01)
*A61G 5/12* (2006.01)
*C04B 35/64* (2006.01)

(52) U.S. Cl.
CPC ............... *A47C 9/002* (2013.01); *A61G 5/12* (2013.01); *A61G 5/125* (2016.11); *C04B 35/64* (2013.01); *A61H 2015/0028* (2013.01); *A61H 2015/0057* (2013.01); *A61H 2201/0149* (2013.01); *A61H 2201/1253* (2013.01); *A61H 2201/1623* (2013.01); *A61H 2201/1671* (2013.01); *A61H 2201/1676* (2013.01); *A61H 2205/081* (2013.01)

(56) References Cited

U.S. PATENT DOCUMENTS

| | | | | |
|---|---|---|---|---|
| 2010/0121235 A1* | 5/2010 | Sasano | ................... | A61H 7/001 601/136 |
| 2012/0306245 A1* | 12/2012 | Yang | ..................... | A47C 7/405 297/230.1 |
| 2014/0371784 A1* | 12/2014 | Kwak | .................... | A61H 39/04 606/204 |
| 2016/0022529 A1* | 1/2016 | Abdo | ..................... | A61H 15/00 601/119 |

* cited by examiner

FUNCTIONAL CHAIR INCLUDING ACUPRESSURE BALLS

CROSS-REFERENCE TO PRIOR APPLICATIONS

This application is a national Stage Patent Application of PCT International Patent Application No. PCT/KR2014/001873, filed on Mar. 7, 2014 under 35 U.S.C. § 371, which claims priority of Korean Patent Application No. 10-2013-0024592, filed on Mar. 7, 2013, which are all hereby incorporated by reference in their entirety.

TECHNICAL FIELD

The present invention disclosed herein relates to a functional chair, which allows a user to comfortably sit thereon at normal times and massages the spinal part of the back and the cervical vertebral part of the neck of a user by allowing acupressure balls to protrude from the inside of a backrest in accordance with the operation of a user.

BACKGROUND ART

As the society is modernized, time spent in working or learning while being sitting on a chair is significantly increasing.

When a bad sitting posture lasts for a long time, various deformations of vertebration such as scoliosis, lordosis, and turtle neck syndrome may be caused.

Thus, curvature or distortion phenomena of spine may cause poor blood circulation or chronic fatigue.

In order to correct these phenomena, steady exercise and physical therapy are needed.

However, first of all, it is important to correct the poor sitting posture, and furthermore, it is important to check whether there is a distortion of the spine while sitting or working on a chair and, if any, to frequently correct the sitting posture.

In this regard, apparatuses for correcting distortion of the spine are disclosed in Korean Patent Nos. 10-981318 and 10-1003756, filed by the present applicant.

However, since extremely limited in utilization as a chair, these apparatuses are inevitably stored in a separate space and are used only for the purpose of correction.

In other words, there is a limitation in that the apparatuses cannot be used at normal times while a user is working or learning sitting thereon.

In order to overcome this limitation, Korean Patent No. 10-1152330 is disclosed by the present applicant. However, since the radius of gyration of acupressure balls for correction of the spine is large, it is difficult for a user having a big build to use, and there is a limitation in that the body of a user needs to significantly move when a user uses the apparatus.

In addition, since a sufficient acupressure effect can be obtained only when a user significantly moves the armrest in a horizontal direction, the apparatus is difficult to use in a limited space.

DISCLOSURE

Technical Problem

The present invention provides a functional chair, which can correct the distortion of the spine only by carrying out simple movement of opening or closing armrests in both directions within a limited space and can correct a sitting posture of a user.

The present invention also provides a functional chair, which can correct the spine and produce an acupressure effect on the spine regardless of the body type and the build of a user.

Technical Solution

In one general aspect, a functional chair including acupressure balls, includes: a chair seat; a back of a chair coupled to one side of the chair seat and extended in the upward direction; a pair of acupressure plate rotary shafts which is parallel to a vertical axis at a position ambilaterally spaced at a predetermined distance from the center of rear surface of the back of the chair; a pair of acupressure plates which rotate around the respective acupressure plate rotary shafts; and a pair of armrests coupled and fixed to one side of the respective acupressure plates, and extended to the front of the back of the chair, wherein: a plurality of operating holes formed by being perforated on the front of the back of the chair at symmetrical positions of both right and left sides based on the vertical axis of the center of the back of the chair are further included; a sleeve for covering the acupressure plate rotary shaft is positioned along a lengthwise direction on the respective acupressure plates, and the acupressure plate rotary shaft penetrates the sleeve such that the respective acupressure plates is rotatably fixed to the respective acupressure plate rotary shafts; a plurality of horizontal extension parts are provided on the respective acupressure plates and extended at a certain length in a perpendicular direction of the sleeve, acupressure ball mounting parts for fixing acupressure balls are provided at the end of the respective horizontal extension parts, and acupressure balls are rotatably fixed in the respective acupressure ball mounting parts; and as the armrests and the acupressure plates rotate on the respective acupressure plate rotary shafts, the plurality of horizontal extension parts and the acupressure balls fixed to the ends of the respective horizontal extension parts protrude to and retract from the front of the back of the chair through the operating holes corresponding to the respective acupressure balls.

In another general aspect, a functional chair including acupressure balls, includes: a chair seat; a back of a chair coupled to one side of the chair seat and extended in the upward direction; a pair of armrest rotary shafts which is parallel to a vertical axis at a position ambilaterally spaced at a predetermined distance from the center of rear surface of the back of the chair; a pair of armrests extending forward from the back of the chair 40 at right and left sides over the chair seat and rotating on the armrest rotary shafts; a pair of acupressure plate rotary shafts which is parallel to a vertical axis at a position ambilaterally spaced at a predetermined distance from the center of rear surface of the back of the chair; and a pair of acupressure plates which rotate around the respective acupressure plate rotary shafts, wherein: the armrest rotary shaft fixedly penetrates one end of the armrest 20 such that the armrest rotates on the armrest rotary shaft; the armrest further includes an armrest sprocket disposed outside the armrest rotary shaft which penetrates the center of the armrest sprocket; a plurality of operating holes formed by being perforated on the front of the back of the chair at symmetrical positions of both right and left sides based on the vertical axis of the center of the back of the chair are further included; a sleeve for covering the acupressure plate rotary shaft is positioned along a lengthwise direction on the respective acupressure plates, and the acupressure plate rotary shaft penetrates the sleeve such that the respective acupressure plates is rotatably fixed to the respective acupressure plate rotary shafts; a plurality of horizontal extension parts are provided on the respective acupressure plates and extended at a certain length in a perpendicular direction of the sleeve, acupressure ball mounting parts for fixing acupressure balls are provided at the end of the respective horizontal extension parts, and acupressure balls are rotatably fixed in the respective acupressure ball mounting parts; the acupressure plate further includes an acupressure plate sprocket disposed outside the sleeve of the acupressure plate, and the acupressure plate sprocket engages with the armrest sprocket; and as the armrest rotates on the armrest rotary shaft, the acupressure plate sprocket engaging with the armrest sprocket rotates, allowing the plurality of horizontal extension parts and the acupressure balls fixed to the ends of the respective horizontal extension parts to protrude to and retract from the front of the back of the chair through the operating holes corresponding to the respective acupressure balls.

The acupressure ball may be manufactured by mixing, stirring and molding at least one selected from the group consisting of silica, diatomite, illite, selenite, elvan, talc, olivine, zircon, zeolite, jade, and phosphate rock of power state at a certain ratio, sintering a molding thereof for about 3 hours to about 4 hours at a temperature of about 1,200 to about 1,500, and then naturally cooling the molding.

The length of at least a portion of the plurality of horizontal extension parts may become gradually longer in a downward direction and may become maximum at a location corresponding to a lumbar part of the back of the chair, and then may gradually become shorter in the downward direction.

Other features and aspects will be apparent from the following detailed description, the drawings, and the claims.

Advantageous Effects

According to embodiments of the present invention, a user can correct distortion of his/her spine only by repeating the movement of opening and closing armrests of a chair in both lateral directions while being sitting on the chair.

Furthermore, since a bad sitting posture in which a user leans backward the lumbar part can be corrected, fatigue and health problem can be prevented from occurring due to long-time working or learning while a user is sitting on a chair.

Particularly, since a sufficient acupressure effect can be produced by only opening and closing the armrests of the functional chair at a minimal angle even in a very narrow space, more space is not needed for its use than a typical chair.

BEST MODE

Figure 1A:
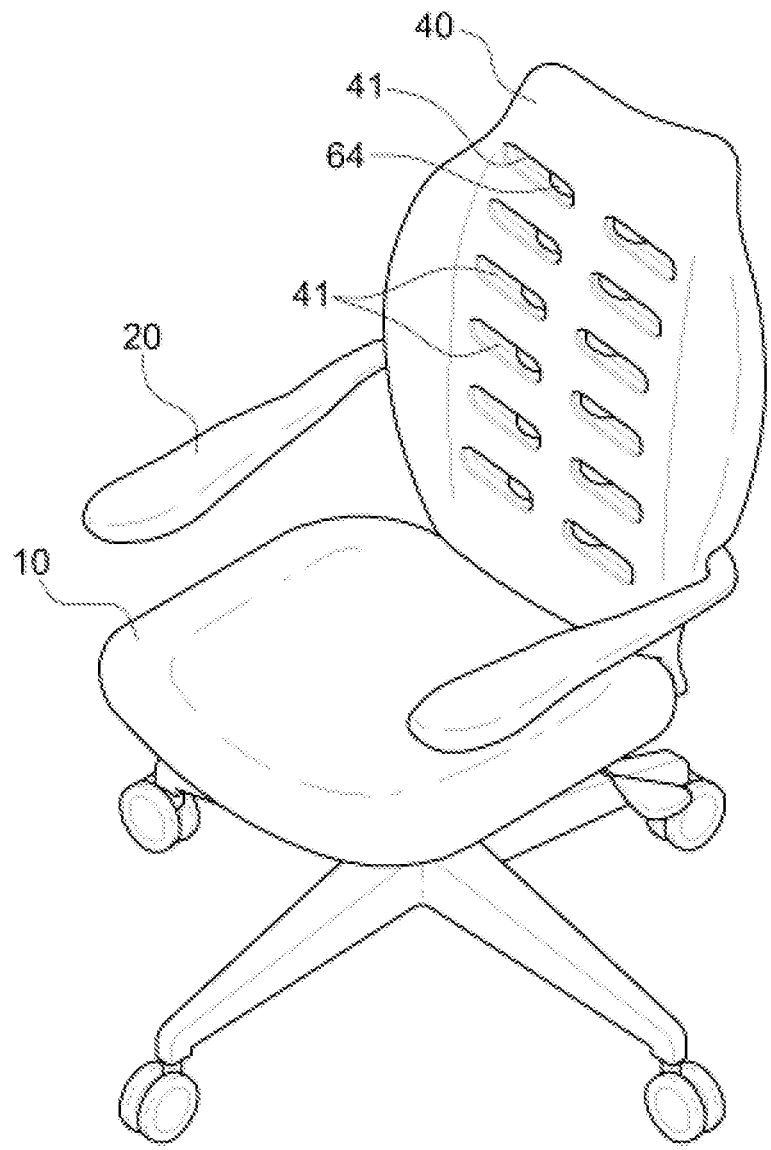
FIGS. 1A and 1B show the exterior and the operation process of a functional chair including acupressure balls according to an embodiment of the present invention.

Hereinafter, exemplary embodiments of the present invention will be described in detail with reference to the accompanying drawings. In order to clarify the present invention, a description irrelevant to the constitution of the present invention will be omitted, and in the drawings, like reference numerals refer to like elements throughout.

Since the terms "including", "including", and "having" can be construed as encompassing corresponding components unless specially described as opposite, it should be understood that they do not exclude other components but encompass other components. Unless defined otherwise, all technical and scientific terms have the same meanings as commonly understood by those skilled in the art to which the present invention belongs.

Hereinafter, the structure of a functional chair including acupressure balls according to an embodiment of the present invention will be described in detail with reference to FIGS. 1 to 3.

FIG. 1 is a view illustrating the exterior and the operation process of a functional chair including acupressure balls according to an embodiment of the present invention. FIG. 2 is a view illustrating the rear surface of the functional chair including acupressure balls shown in FIG. 1. FIG. 3 is a view illustrating acupressure balls protruding in accordance with opening of armrests.

As shown in FIG. 1, the functional chair including acupressure balls according to the embodiment may include a chair seat 10, armrests 20, and a back of a chair 40 like a typical chair when viewed from the front side.

Figure 2:
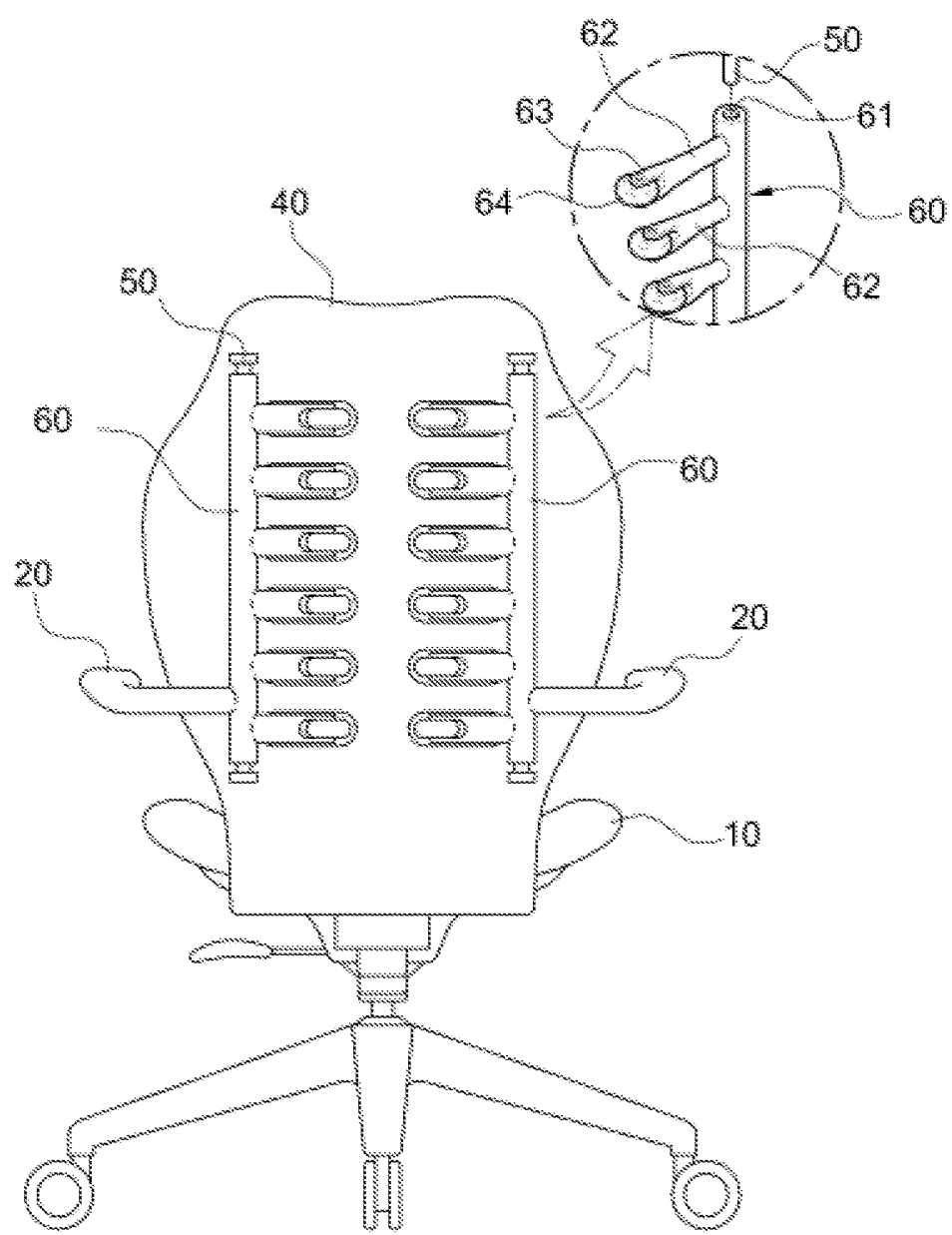
FIG. 2 is a view illustrating the rear surface of the functional chair including acupressure balls shown in FIG. 1.

Meanwhile, as shown in FIG. 2, the functional chair may further include a pair of acupressure plate rotary shafts 50 and a pair of acupressure plates 60 which are disposed at both sides when viewed from the rear side.

The chair seat 10 may corresponds to a part on which a user sits.

Meanwhile, the back of the chair 40 may be a part against which a user leans his/her back while sitting on the chair. As shown in FIG. 1, the back of the chair 40 may be coupled to one side of the chair seat 10, and may extend in an upward direction.

As shown in FIG. 2, the pair of acupressure plate rotary shafts 50 may be disposed parallel to a vertical axis at a position ambilaterally spaced by a predetermined distance from the center of rear surface of the back of the chair 40.

That is, the acupressure plate rotary shafts 50 may be each disposed at left and right sides of the rear surface of the back of the chair 40 in a vertical direction.

The acupressure plate 60 may include a sleeve 61 covering the acupressure plate rotary shaft 50 in a vertical direction. As magnified in the right top of FIG. 1, the acupressure plate rotary shaft 50 may be disposed to penetrate the inside of the sleeve 61.

Thus, the acupressure plate 60 may be rotatably fixed to the acupressure plate rotary shaft 50.

Meanwhile, the acupressure plate 60 may be provided with a plurality of horizontal extension parts 62 disposed at certain intervals and extending by a certain length in a direction perpendicular to the sleeve 61.

As shown in FIG. 2, the plurality of horizontal extension parts 62 may extend from the acupressure plate 60 in a horizontal direction at certain intervals, and the horizontal extension parts 62 of one pair of acupressure plates 60 may be disposed so as to be opposite to each other.

The horizontal extension parts 62 may be disposed parallel to each other, respectively, but the length and the angle of the end portion at which the acupressure balls 64 are disposed may vary in accordance with design.

Also, an acupressure ball mounting part 63 may be provided at the end of the horizontal extension part to fix the acupressure ball 64, respectively.

The acupressure ball 63 may be rotatably fixed in the acupressure ball mounting part 63.

The acupressure ball 64 may have a spherical shape, the inside of which is perforated.

Also, the acupressure ball mounting part 63 may penetrate the perforated acupressure ball 64 to hold the acupressure ball 64 such that the acupressure ball 64 can rotate.

As shown in FIG. 2, one pair of armrests 20 may be each disposed at both sides over the chair seat 10, and may extend to the front side of the back of the chair 40.

In this case, the armrests 20 may be coupled and fixed to one side of the acupressure plate 60, respectively.

Figure 3:
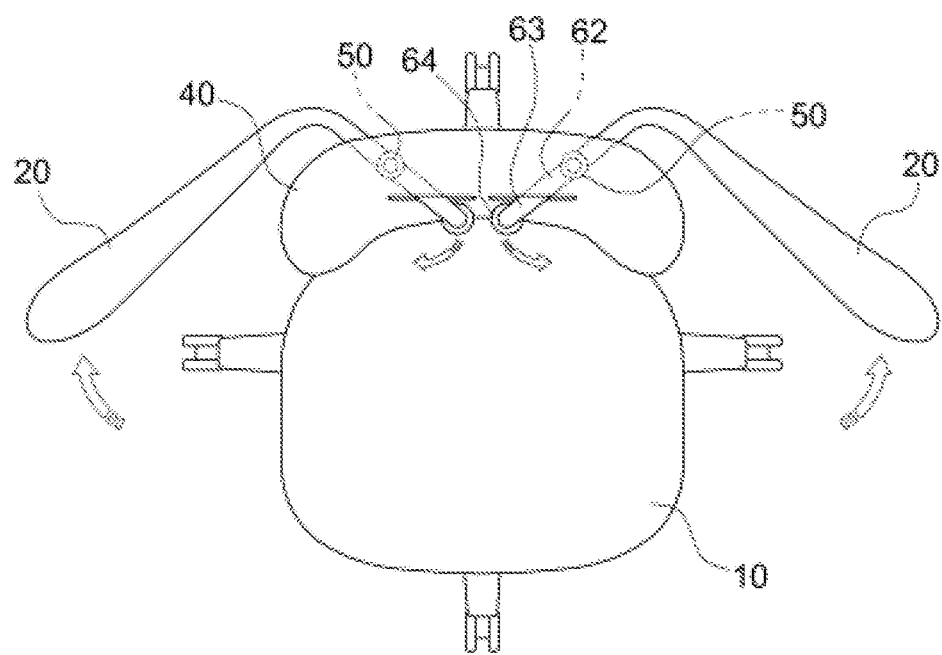
FIG. 3 is a view illustrating acupressure balls protruding in accordance with opening of armrests.

Thus, as shown in FIG. 3, when the armrests 20 are opened in both side directions of the chair seat 10, the acupressure plate 60 may rotate on the acupressure plate rotary shaft 30.

As shown in FIG. 1, a plurality of operating holes 41 may be formed by being perforated on the front surface of the back of the chair 40 at symmetrical positions of both right and left sides based on the vertical axis of the center of the back of the chair.

In this case, the plurality of operating holes 41 may be formed at certain intervals on both right and left sides of the front surface of the back of the chair 40.

Figure 1B:
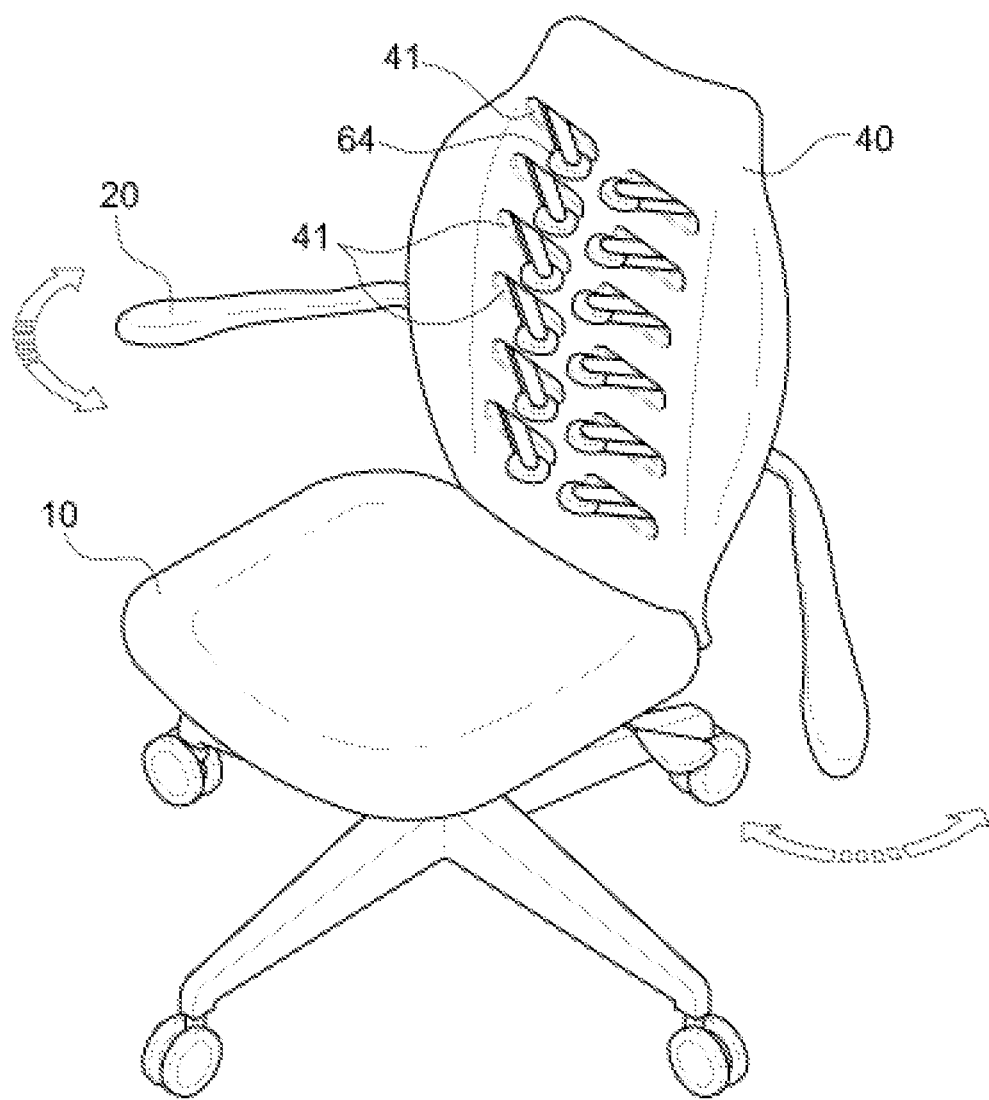

As shown in FIG. 1B, the operating hole 41 may corresponding to a space through which the acupressure ball 64 and the horizontal extension part protruding and retracting from/to the inside of the back of the chair 40. The shape and the length may vary in accordance with the length and the shape of the acupressure ball 64 or the horizontal extension part 62.

A user may open the armrests 20 in both side directions while sitting on the chair seat 10 and placing his/her arms on the armrest 20.

FIG. 1A illustrates a case where the armrests 20 are placed at a reference location, and FIG. 1B illustrates a case where the armrests 20 are opened at a certain angle in an outward direction.

As a user opens the armrests 20 outwardly, the acupressure balls 64 and the horizontal extension parts 62 may protrude from the inside of the back of the chair 40.

FIG. 3 shows the operation principle in more detail.

As shown in FIG. 3, as both armrests 20 are opened outwardly, the acupressure plate 60 may rotate on the acupressure plate rotary shaft 50.

Thus, the horizontal extension parts 20 of both acupressure plates 60 held in the back of the chair 40 may protrude from the inside of the operating holes 41 to the front side of the back of the chair 40.

In Korean Patent No. 10-1152330 entitled "Functional Chair" and owned by the present applicant, the functional chair operates such that the spinal part, cervical vertebral part and lumbar part of the back of a user are gathered inwardly while acupressure balls at both sides move from the outside to the inside of the back of the chair 40.

However, since the radius of gyration is too large, the functional chair is inconvenient to use.

However, in this embodiment, since it is possible to sufficiently reduce the radius of gyration, the posture can be easily corrected even though a user does not significantly move his/her body in forward and backward directions while being sitting on the seat.

Furthermore, since the acupressure balls 64 at both sides are disposed at points opposite to each other, the balance of the body can be more easily adjusted when a user uses the functional chair according to this embodiment.

Meanwhile, compared with Korean Patent No. 10-1152330 entitled "Functional Chair" and owned by the present applicant, the movement direction of the acupressure balls 64 is opposite to each other. That is, in this embodiment, when a user opens his/her arms, the acupressure balls 64 may also spread out. Also, when a user closes his/her arms, the acupressure balls 64 may push muscles and bones from both sides of the spine and cervical vertebra, and lumbar. Accordingly, the present invention has an advantage in that the hand motion of a user coincides with the action direction of the acupressure balls on the back of a user.

Meanwhile, the effect of acupressure may differ in accordance with the form or material of the acupressure ball 64.

For the optimal acupressure effect, the acupressure ball 64 may be manufactured as follows.

First, powder of silica, diatomite, illite, selenite, elvan, talc, olivine, zircon, zeolite, jade, and phosphate rock may be mixed at a certain ratio and then stirred in a stirrer.

Thereafter, the mixture may be molded to have an annular shape having a hole therein, and the molding may be put and sintered in a sintering furnace for about 3 to 4 hours at a temperature of about 1,200° C. to about 1,500° C.

Thereafter, the acupressure balls may be naturally cooled for about 24 hours or more at room temperature.

In this case, a cover formed of a synthetic resin material may be covered to reduce the hardness and thus relieve pain applied to the back of a user.

Thus, the acupressure ball 64 can be manufactured.

Accordingly, an effect of far-infrared radiation can also be obtained in addition to the effect of acupressure.

Figure 6:
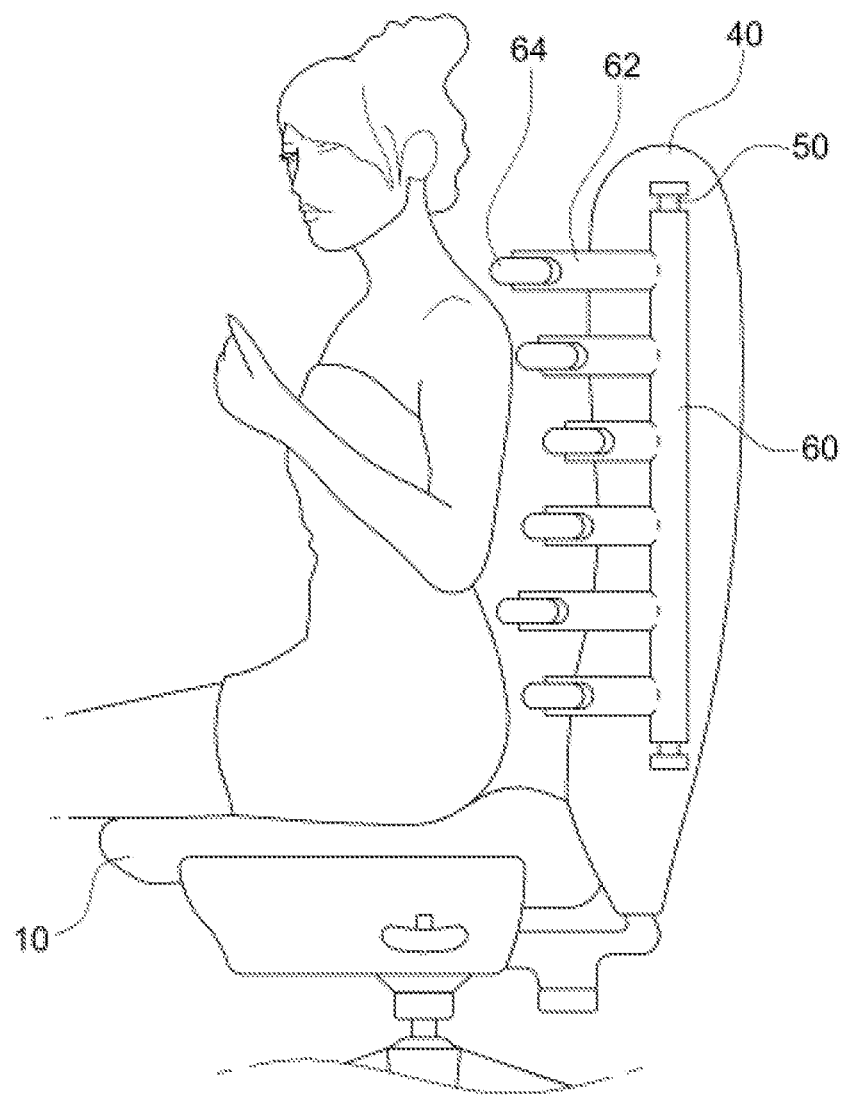
FIG. 6 is a view illustrating acupressure balls making contact with the back of a user while a user is sitting on a chair.

FIG. 6 is a view illustrating acupressure balls making contact with the back of a user while a user is sitting on a chair.

When a healthy user sits on the chair and keeps eyes forward while stretching his/her back, the cervical vertebral part may slightly lean forward and the thoracic vertebra may be relatively located backward while adhering closely to the back of the chair. Also, the lumbar may be slightly spaced from the back of the chair 40. The coccygeal vertebral part may adhere closely to the rear side of the chair seat 10.

The horizontal extension parts 62 may have different lengths such that a user can maintain the above-mentioned posture when using the functional chair including acupressure balls.

As shown in FIG. 6, it can be seen that the line that connects the acupressure balls 64 on the ends of the horizontal extension parts 64 may define an S-shaped profile.

That is, the length of the horizontal extension part 62 corresponding to the cervical vertebral part at the uppermost side is relatively long, but the lengths of the horizontal extension parts 62 corresponding to the thoracic vertebral part under the cervical vertebral part may gradually become shorter.

Thereafter, the length of the horizontal extension parts 62 may gradually become longer, and at the maximum length, may gradually become shorter toward the coccygeal vertebral part at the lowermost side.

Thus, only when a user repeats opening and closing movement of the armrests 20 in both side directions while being sitting on the chair seat 10, the posture of a user, as shown in FIG. 6, may be corrected into natural and healthy posture of an S-shape.

Hereinafter, the structure of a functional chair including acupressure balls according to another embodiment of the present invention will be described in detail with reference to FIGS. 4 and 5.

Figure 4:
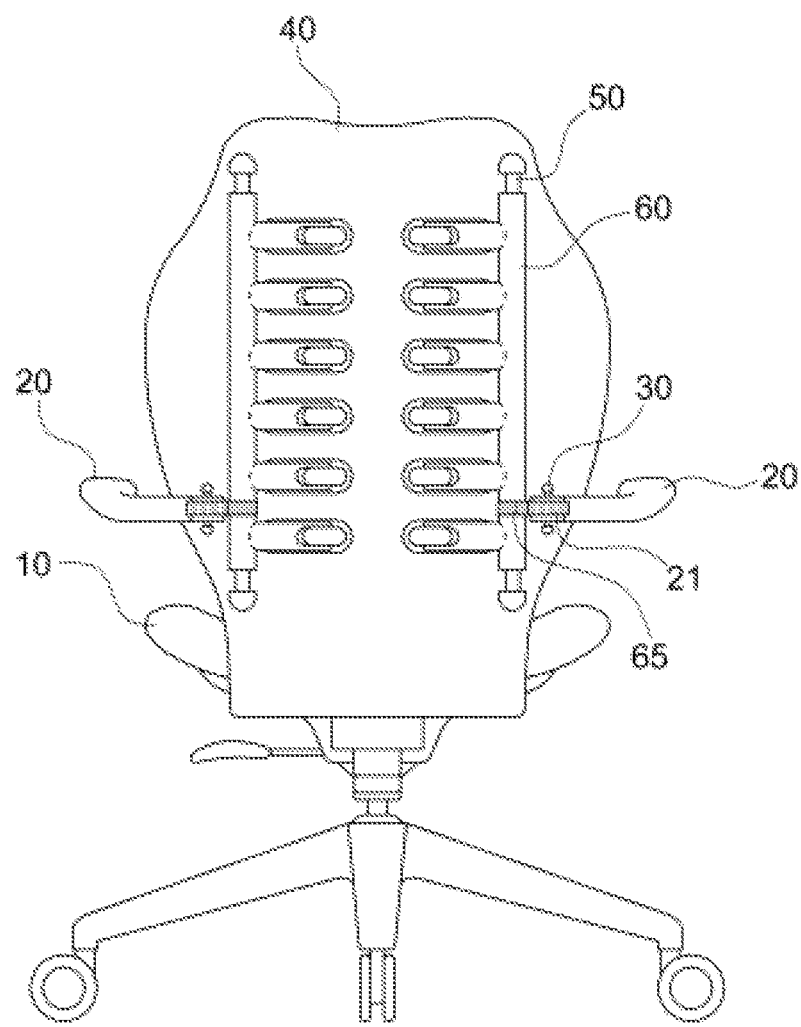
FIG. 4 is a view illustrating the structure of a functional chair including acupressure balls according to another embodiment of the present invention.
Figure 5:
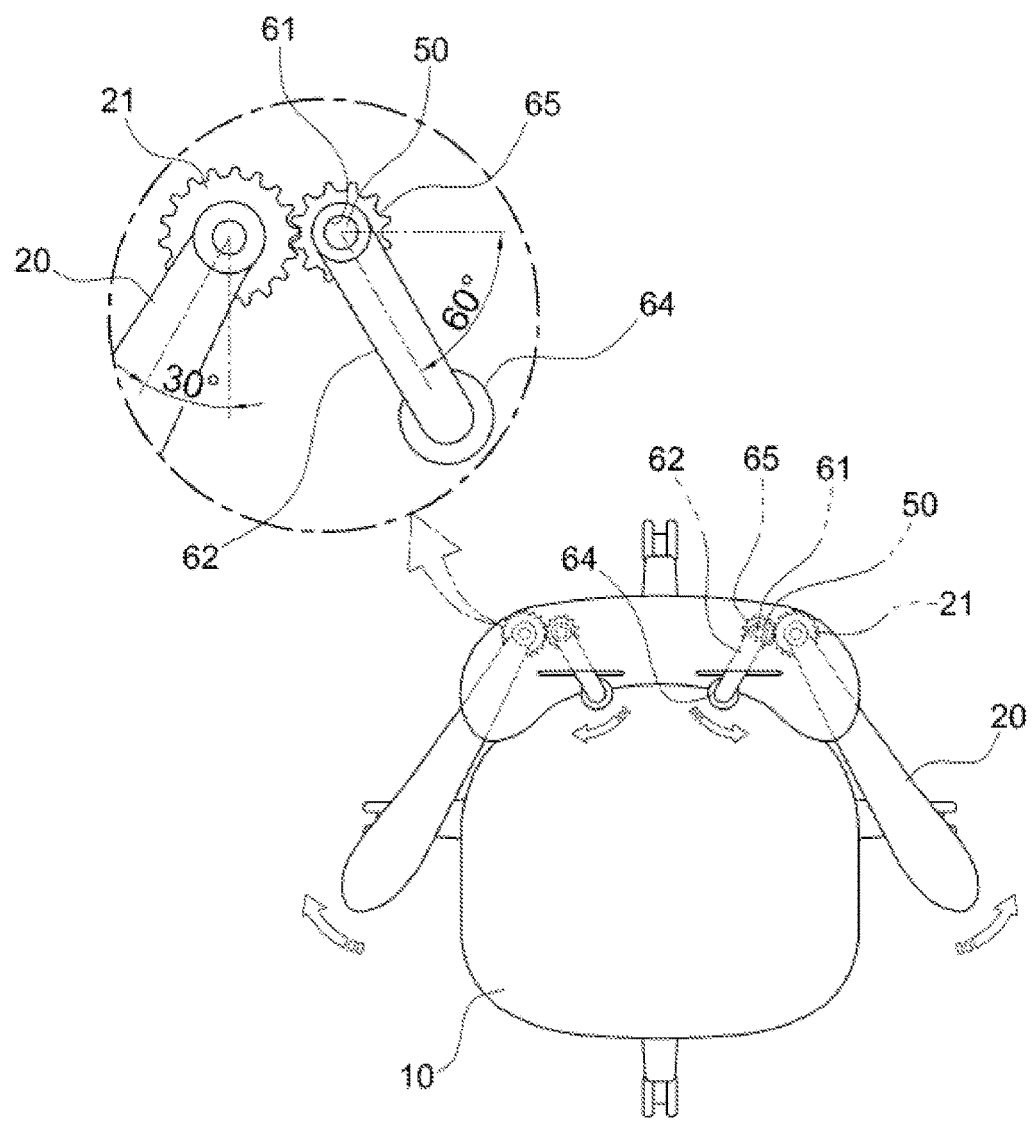
FIG. 5 is a view illustrating the operation principle of the functional chair including acupressure balls as shown in FIG. 4.

FIG. 4 is a view illustrating the structure of a functional chair including acupressure balls according to another embodiment of the present invention, and FIG. 5 is a view illustrating the operation principle of the functional chair including acupressure balls as shown in FIG. 4.

As shown in FIG. 1, since the rotation angles of the armrest 20 and the horizontal extension part 62 accurately coincide with each other, the armrests 20 need to be sufficiently opened in right and left directions in order to obtain a sufficient acupressure effect even though the acupressure balls 64 protrude outwardly from the central portion of the operating hole 41.

However, the rotation angle of the armrest 20 needs to be reduced for use of the chair in a limited space.

That is, although a user does not excessively open or close the armrests 20, sufficient motion of the acupressure balls 65 needs to be secured to maximize the acupressure effect.

For this, as shown in FIGS. 4 and 5, the rotation ratio of the armrest 20 and the acupressure plate 60 may be adjusted by sprockets.

While the armrest 20 and the acupressure plate 60 according to the previous embodiment are connected to each other and rotate on the acupressure plate rotary shaft 50 as shown in FIG. 1, the armrest 20 and the acupressure plate 60 according to another embodiment may rotate on different rotary shafts.

Specifically, as shown in FIG. 4, the armrests 20 may rotate on a pair of armrest rotary shafts 30 disposed at both rear sides of the back of the chair 40, respectively.

On the other hand, the acupressure plate 60 may rotate on a pair of acupressure plate rotary shafts 50 disposed inside the armrest rotary shafts 30.

The armrest 20 may further include an armrest sprocket 21 disposed outside the armrest rotary shaft 30 which penetrates the center of the armrest sprocket 21.

Also, the acupressure plate 60 may further include an acupressure plate sprocket 65 disposed outside the sleeve 61 of the acupressure plate 60, and the acupressure plate sprocket 65 may engage with the armrest sprocket 21.

Thus, the acupressure balls 64 can efficiently move so as to obtain a sufficient acupressure effect while the armrests 20 minimally move through adjustment of the gear ratio of the sprockets.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

MODE FOR INVENTION

Industrial Applicability

The present invention can be applied to the functional chair technology field.

The invention claimed is:

1. A functional chair comprising acupressure balls, comprising:
   a chair seat;
   a back of a chair coupled to one side of the chair seat and extended in the upward direction;
   a pair of acupressure plate rotary shafts which are parallel to a vertical axis at a position ambilaterally spaced at a predetermined distance from the center a rear surface of the back of the chair;
   a pair of acupressure plates which rotate around the respective acupressure plate rotary shafts; and
   a pair of armrests coupled and fixed to one side of the respective acupressure plates, and extended to the front of the back of the chair,
   wherein:
   a plurality of operating holes formed by being perforated on the front of the back of the chair at symmetrical positions of both right and left sides based on the vertical axis of the center of the back of the chair;
   a sleeve for covering the acupressure plate rotary shaft is positioned along a lengthwise direction on the respective acupressure plates, and the acupressure plate rotary shaft penetrates the sleeve such that the respective acupressure plates is rotatably fixed to the respective acupressure plate rotary shafts;
   a plurality of horizontal extension parts are provided on the respective acupressure plates and extended at a certain length in a perpendicular direction of the sleeve, acupressure ball mounting parts for fixing acupressure balls are provided at the end of the respective horizontal extension parts, and acupressure balls are rotatably fixed in the respective acupressure ball mounting parts; and
   as the armrests and the acupressure plates rotate on the respective acupressure plate rotary shafts, the plurality of horizontal extension parts and the acupressure balls fixed to the ends of the respective horizontal extension parts protrude to and retract from the front of the back of the chair through the operating holes corresponding to the respective acupressure balls.

2. The functional chair of claim 1, wherein the acupressure balls are manufactured by mixing, stirring and molding at least one selected from the group consisting of silica, diatomite, illite, selenite, elvan, talc, olivine, zircon, zeolite, jade, and phosphate rock of power state at a certain ratio, sintering a molding thereof for about 3 hours to about 4 hours at a temperature of about 1,200° C. to about 1,500° C., and then naturally cooling the molding.

3. The functional chair of claim 1, wherein the length of at least a portion of the plurality of horizontal extension parts becomes gradually longer in a downward direction and becomes maximum at a location corresponding to a lumbar part of the back of the chair, and then gradually becomes shorter in the downward direction.

4. A functional chair comprising acupressure balls, comprising:
   a chair seat;
   a back of a chair coupled to one side of the chair seat and extended in the upward direction;

a pair of armrest rotary shafts which are parallel to a vertical axis at a position ambilaterally spaced at a predetermined distance from the center a rear surface of the back of the chair;

a pair of armrests extending forward from the back of the chair at right and left sides over the chair seat and rotating on the armrest rotary shafts;

a pair of acupressure plate rotary shafts which are parallel to a vertical axis at a position ambilaterally spaced at a predetermined distance from the center the rear surface of the back of the chair; and a pair of acupressure plates which rotate around the respective acupressure plate rotary shafts, wherein:

the armrest rotary shaft fixedly penetrates one end of the armrest such that the armrest rotates on the armrest rotary shaft;

the armrest further comprises an armrest sprocket disposed outside the armrest rotary shaft which penetrates the center of the armrest sprocket;

a plurality of operating holes formed by being perforated on the front of the back of the chair at symmetrical positions of both right and left sides based on the vertical axis of the center of the back of the chair;

a sleeve for covering the acupressure plate rotary shaft is positioned along a lengthwise direction on the respective acupressure plates, and the acupressure plate rotary shaft penetrates the sleeve such that the respective acupressure plates is rotatably fixed to the respective acupressure plate rotary shafts;

a plurality of horizontal extension parts are provided on the respective acupressure plates and extended at a certain length in a perpendicular direction of the sleeve, acupressure ball mounting parts for fixing acupressure balls are provided at the end of the respective horizontal extension parts, and acupressure balls are rotatably fixed in the respective acupressure ball mounting parts;

the acupressure plate further comprises an acupressure plate sprocket disposed outside the sleeve of the acupressure plate, and the acupressure plate sprocket engages with the armrest sprocket; and as the armrest rotates on the armrest rotary shaft, the acupressure plate sprocket engaging with the armrest sprocket rotates, allowing the plurality of horizontal extension parts and the acupressure balls fixed to the ends of the respective horizontal extension parts to protrude to and retract from the front of the back of the chair through the operating holes corresponding to the respective acupressure balls.

* * * * *